United States Patent [19]
Bratschitsch

[11] 3,734,777
[45] May 22, 1973

[54] APPLYING A PRESERVATIVE TO GRAIN OR THE LIKE

[75] Inventor: John Bratschitsch, Hamilton, Ontario, Canada

[73] Assignee: The Lely Corporation, Wilson, N.C.

[22] Filed: Dec. 7, 1970

[21] Appl. No.: 95,854

[52] U.S. Cl. .................. 134/132, 99/487, 259/7, 118/316
[51] Int. Cl. .................................................. B05c 5/00
[58] Field of Search .................. 99/237, 249, 258, 99/487, 488, 485; 118/300, 313–316, 19, 24; 134/132; 259/DIG. 37, 7; 195/131

[56] References Cited

UNITED STATES PATENTS

| | | | |
|---|---|---|---|
| 941,821 | 11/1909 | Sorenson | 134/132 X |
| 1,674,142 | 6/1928 | Strang | 134/132 X |
| 2,289,727 | 7/1942 | Randolph | 99/235 R |
| 3,135,668 | 6/1964 | Wesson | 134/132 |
| 2,898,881 | 8/1959 | Straley | 118/24 |
| 1,116,945 | 11/1914 | Spenst et al. | 259/7 X |

FOREIGN PATENTS OR APPLICATIONS 758,181  8/1954  Germany .................... 134/132

Primary Examiner—Leon G. Machlin
Attorney—Mason, Mason & Albright

[57] ABSTRACT

An implement for applying a preservative to grain or the like, comprising a frame supporting a hopper, means for applying the preservative and conveyor means for discharging the grain or the like from said hopper. The conveyor means is located in a space which adjoins the hopper near its lower side. The means for applying the preservative comprises at least one spray nozzle by means of which the preservative can be brought into contact with the grain or the like.

7 Claims, 2 Drawing Figures

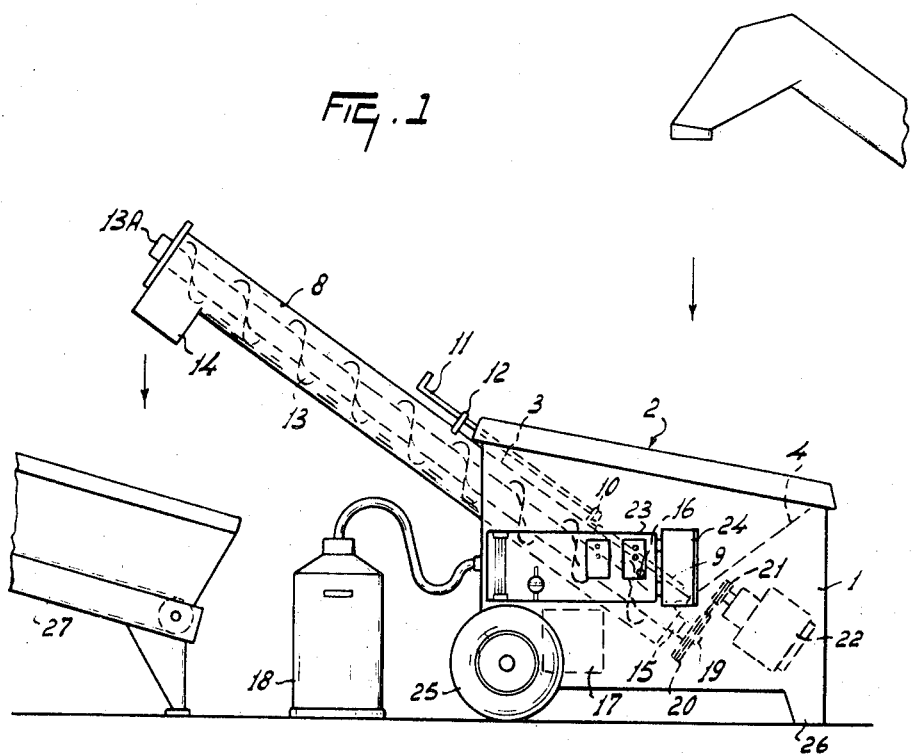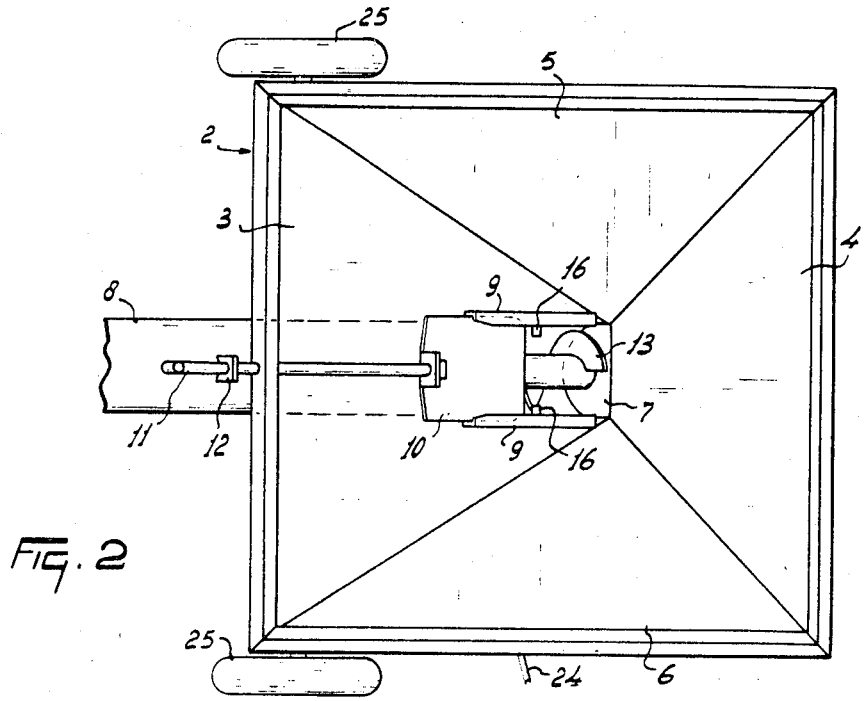
INVENTOR
JOHN BRATSCHITSCH

APPLYING A PRESERVATIVE TO GRAIN OR THE LIKE

The invention relates to an implement for applying a preservative to grain or the like. Up to now, harvested grain had to be dried so as to prevent the growth of mold and the like. Thus the major limitation is the high capital costs of the specialized equipment which is used only for a small part of the year. By means of a liquid preservative, e.g., propionic acid, which is sprayed on the grain, mold growth can be prevented without the high costs as mentioned before.

The construction according to the invention now has for its object to provide an implement by means of which the preservative can be applied to the grain or the like in a very efficient, simple and economical way. In accordance with the invention, an implement is provided comprising a frame supporting a hopper, means for applying the preservative and conveyor means for discharging the grain or the like from the hopper, the conveyor means being housed in a space which adjoins the said hopper at its lower side, the said applying means comprising at least one spray nozzle near the bottom of the hopper.

For a better understanding of the invention and to show how the same may be carried into effect, reference is made by way of example to the accompanying drawings, in which:

FIG. 1 is a side view of an implement according to the invention and

FIG. 2 is, on an enlarged scale, a plan view of the implement shown in FIG. 1.

The construction shown in the Figures comprises a rectangular frame 1 which comprises four vertically extending walls which support a hopper 2 of a pyramidal shape. The hopper 2 has two opposing side walls 3 and 4 which adjoin each other at the bottom of the hopper along an intersecting line extending substantially horizontally. Between these opposing walls there are provided two side walls 5 and 6. As can be seen from FIG. 1, the wall 3 is higher than the opposing wall 4. The wall 3, near the bottom of the hopper 2, is provided with a rectangular aperture 7, the width of which is the same as the length of the intersecting line between the two opposing walls 3 and 4. By means of the aperture 7 a longitudinal space afforded by a tube 8 adjoins the lower side of the hopper by means of said aperture. The center line of the tube 8 extends substantially parallel to the side wall 3. At each upwardly extending side of the aperture 7 there is provided a guide 9 for a closure member 10 which is connected to a rod 11 which extends upwardly parallel to the tube 8 and is slidably supported by means of a tag 12 on the said tube. The upper end of the rod 11 is bent such as to provide a grip for adjustment of the rod and for adjustment of the closure member. The closure member is movable with sufficient friction between the guides 9 so that it can be brought in a number of positions in order to increase or decrease the width of the aperture 7. In the tube 8 is housed an auger 13 the axis of rotation of which coincides with the center line of the tube and which has a diameter such that its circumference lies adjacent the wall of the tube. At its upper end the tube 8 is provided with a discharging mouth 14. The upper end of the auger 13 is supported by a bearing 13A, whereas the lower end of the auger 13 is supported by a bearing 15 which is secured to a portion forming the bottom of the tube 8 and being an extension of the side wall 4 of the hopper which opposes the side wall 3 comprising the aperture 7.

As is shown in FIG. 2, at each side of the center line of the space afforded by the tube 8 at a distance from the bottom there is provided a spray nozzle 16 in such a way that the spray nozzles 16 are facing each other. Each of said spray nozzles 16 by means of a conduit is connected to a pump 18a by means of which a preservative, e.g., propionic acid, can be pumped out of a reservoir 18. The lower end of the auger 13 which is supported by the bearing 15 extends through said bearing by means of a shaft 19 on which a pulley 20 is mounted, the said pulley by means of a V-belt being in driving connection with a pulley 21 on the shaft of a motor 22. By means of said motor and by means of a driving mechanism, not shown, the pump 18a can also be driven. In one of the upwardly extending walls affording the frame 1 which supports the hopper 2 an opening is provided giving access to a housing 23 in which control means for the motor, the pump and the auger are housed. The opening can be shut by means of a hingeable door 24. The frame at the side of the tube 8 comprising the auger 13 is provided with a pair of ground wheels 25 arranged near the angles of the rectangle. The two other angles are supported by means of legs 26.

The implement described above operates as follows. By means of the closure member 10 the aperture 7 near the bottom of the hopper 2 can be closed and grain or the like discharged from a wagon or the like. After filling the hopper 2, the aperture 7 can be opened by sliding the closure member 10 in an upward direction. By means of the closure member the width of the aperture 7 can be regulated and therewith the flow of the grain or the like to the tube 8 in which the auger 13 is rotating. From the bottom of the tube 8 by means of the auger 13 the grain is guided between the spray nozzles 16 and up to the discharge opening 14 near the upper side of the tube. During the passage between the spray nozzles 16 whereby the space in which the nozzles are arranged by means of the closure member 10 can be separated from the hopper, the preservative is applied in a measured quantum to the grain or the like so that all of the grain passing the spray nozzles gets the required quantum of preservative. By means of the discharge opening 14 on top of the tube 8 the grain or the like can be discharged in a conveyor 27 by means of which it can be brought into a store.

The implement described provides a simple and effective means for applying the preservative to the grain or the like. The implement has a large capacity of about 20 tons per hour and can treat a full day's harvest in a few hours. Further it permits a fast, continuous harvesting and storage operation.

I claim:

1. An implement for applying a preservative to grain or the like, comprising a hopper supported on a frame and conveying means associated with that implement for moving and discharging grain from said hopper, said conveying means including a housing with a discharge space extending longitudinally in an upward direction and an auger disposed in said space, said discharge space communicating with the lower part of said hopper by an aperture located substantially at the center of the lower part of a side wall of said hopper, a closure member being mounted on said side wall over said aperture and said closure member being movable to a number of positions to increase and decrease the width of said aperture, preservative spraying means including opposing spray nozzles positioned at opposite sides of said aperture, approximately centrally thereof below and substantially equally spaced from said closure member, said nozzles being located on opposite sides of the axis of rotation of said auger to face each other and spray preservative transverse to the path of the grain being conveyed, whereby a measured quantum of preservative can be sprayed on the grain or the like, as same is conveyed in said space to pass between said nozzles before being discharged.

2. An implement as claimed in claim 1, wherein said hopper is multisided and has a pyramidal shape, said side wall adjoining at its lower part an opposing side wall of said hopper along an intersecting line extending substantially horizontally.

3. An implement as claimed in claim 2, wherein the connection between said side walls extends substantially perpendicular to the center line of said space.

4. An implement as claimed in claim 1, wherein said spray nozzles are located adjacent the axis of rotation of said auger.

5. An implement as claimed in claim 1, wherein the axis of said auger coincides with the center line of said housing, said housing comprising a tube that includes said space and extends substantially parallel to said side wall of the hopper.

6. An implement as claimed in claim 5, wherein the lower end of said auger is supported by an extension of a second side wall which faces said first mentioned side wall with said aperture.

7. An implement as claimed in claim 1, wherein said frame is supported by at least one pair of ground wheels and a pump is provided on said frame in order to supply liquid preservative under pressure from a reservoir to said spray nozzles.

* * * * *